Nov. 29, 1960     F. L. MALTBY ET AL     2,962,641
NULL-BALANCE BRIDGE SERVOSYSTEM
Filed May 21, 1956
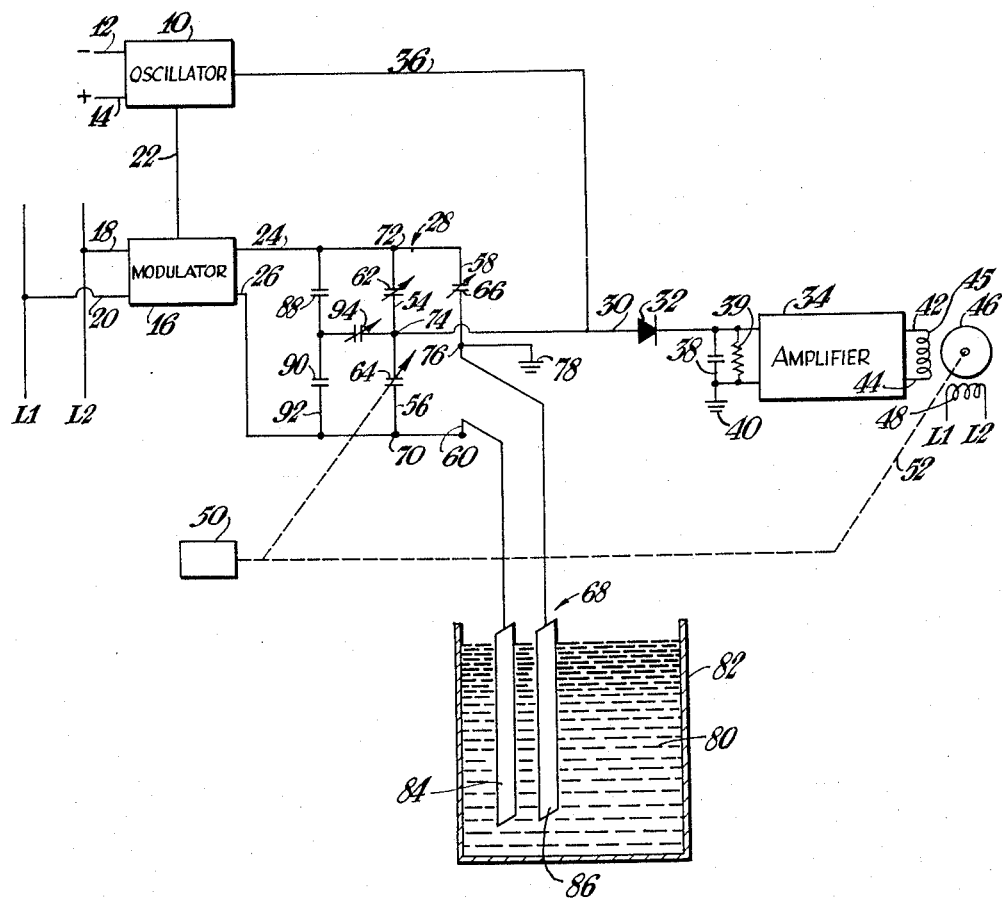
INVENTORS.
*Frederick L. Maltby, Joseph W. Philippi & Edward Cozzette.*
BY
*THEIR ATTORNEY.*

United States Patent Office 2,962,641
Patented Nov. 29, 1960

2,962,641

NULL-BALANCE BRIDGE SERVOSYSTEM

Frederick L. Maltby, Riverton, and Joseph W. Philippi, Woodbury, N.J., and Edward N. Cozzette, Huntington Station, N.Y., assignors to Robertshaw Fulton Controls Company, Richmond, Va., a corporation of Delaware
Filed May 21, 1956, Ser. No. 586,038
13 Claims. (Cl. 318—29)

This invention relates to electrical measuring and/or controlling mechanisms, and more particularly to a device of this nature in which changes in an electrical signal, indicative of the changes of a condition to be measured and/or controlled is converted to a measuring and/or controlling signal without the necessity of high frequency amplifiers.

An object of the present invention is to rebalance an R.F. frequency bridge using a conventional 60 cycle motor.

Another object of the invention is to utilize a separate zero and span adjustment for facilitating adjustment of an R.F. frequency bridge to any desired range of operation.

Another object of the invention is to measure an impedance, indicative of a condition to be measured and/or controlled at radio frequency without the use of radio frequency amplifiers.

The present invention takes the form of an impedance bridge having a capacitor in each branch thereof, one of the capacitors serving as a sensing probe for a condition to be measured and/or controlled and another capacitor serving as a means for balancing the bridge in the event the probe capacitor has varied. The bridge is supplied with a radio frequency voltage which is modulated at a lower frequency, for example, the ordinary house voltage at 60 cycles. A reference unmodulated R.F. voltage is mixed with the output of the bridge circuit during the unbalance thereof to provide for phase sensitive demodulation. This next signal is demodulated to produce a 60 cycle voltage whose phase depends upon the direction of bridge unbalance. Upon amplification, the 60 cycle output resulting from this demodulation is utilized to energize a reversible motor which in turn is used to rebalance the R.F. bridge. The bridge is provided with a zero and span adjustment means whereby the range and zero of the bridge may be adjusted to meet various situations.

Other objects and advantages will become apparent from the following description taken in connection with the accompanying drawings wherein:

The figure is a schematic showing of an electrical measuring and/or controlling mechanism embodying this invention.

Referring more particularly to the drawing, the invention comprises an R.F. oscillator 10 connected to a suitable D.C. source by lead wires 12, 14. A modulator 16 is connected by lead wires 18, 20 to a suitable 60 cycle source L1, L2 and connected by a lead wire 22 to the oscillator 10. The signal received from the oscillator 10 by means of the lead wire 22 is amplified and modulated at a 60 cycle rate by the modulator 16.

The output terminals of the modulator 16 are connected by lead wires 24, 26 to an R.F. bridge circuit indicated generally by the reference numeral 28 and which is connected by an output conductor 30 through a rectifier 32 to the input of an amplifier 34. The oscillator 10 is also connected by a lead wire 36 to the output conductor 30 for mixing an unmodulated signal with the modulated output of the bridge circuit 28 to provide phase sensitivity. This unmodulated signal from the oscillator 10 is mixed with the modulated output of the bridge circuit 28 thereby impressing a mixed voltage on the rectifier 32. This mixed signal is demodulated by the rectifier 32 to produce a 60 cycle voltage, the phase of which depends on the direction of the bridge unbalance and which is connected to the input of the amplifier 34. A capacitance 38 is connected across the input terminals of the amplifier 34, one of said terminals being also connected to a ground connection 40. A resistance 39 is also connected across the input terminals of the amplifier 34.

The output terminals of the amplifier 34 are connected by lead wires 42, 44 to a field winding 45 of a reversible motor 46 which has a winding 48 connected to the source L1, L2 of 60 cycle voltage. The motor 46 is mechanically coupled to an indicator or controller 50 by a mechanical linkage 52.

Referring more particularly to the bridge circuit 28, this circuit component comprises conductor arms 54, 56, 58, 60. The arms 54, 56 include a pair of variable capacitors 62, 64 respectively, while the arms 58, 60 include a variable capacitor 66 and a condition responsive probe 68 respectively. The bridge circuit 28 defines a pair of input terminals 70, 72 connected to the conductors 26, 24 respectively and a pair of output terminals 74, 76 which are connected to the output conductor 30 and a ground connection 78 respectively.

For purposes of illustration only, the present invention is shown as indicating and/or controlling the amount of material 80 in a container 82. To this end, the condition responsive probe 68 comprises a pair of capacitor plates 84, 86 insulatingly supported in the container 82 by any suitable means. As the level of the material 80 rises and falls, the capacitance between the plates 84, 86 will vary in accordance with changes in the amount of material in the container 82 in a manner well known in the art.

It will now be apparent that the bridge circuit 28 will be balanced when the ratio of the capacities of the capacitors 66, 68 equals the ratio of the capacities of the capacitors 62, 64. Accordingly, any variation in the capacitance between the plates 84, 86 will cause unbalance of the bridge 28. When the bridge 28 is balanced, only the unmodulated R.F. voltage will be impressed on the rectifier 32, and, since the amplifier 34 will not respond to a D.C. voltage, no signal will be delivered to the motor 46. However, when the bridge 28 is unbalanced, a modulated R.F. signal which will be in phase or out of phase with the unmodulated reference voltage supplied by the conductor 36, will be received by the rectifier 32. Accordingly, the modulated R.F. signal will be demodulated by the rectifier 32 and delivered to the winding 42 of the motor 46.

For rebalancing the bridge, the motor 46 is also coupled to the variable capacitor 64 by the linkage 52. Upon energization of the motor 46, the capacitance of the capacitance 64 will be adjusted in a direction necessary to rebalance the bridge.

The invention thus far described comprises a fixed span bridge whereby the probe capacitor 68 must vary by the percentage of variation obtainable with the rebalance capacitor 64, in order to achieve full scale deflection. To illustrate this fixed span, the following elements may have the designated exemplary values:

$C_{62}$ = 10 micromicrofarads
$C_{64}$ = 10 micromicrofarads with a range of 10 to 20 micromicrofarads
$C_{66}$ = 200 micromicrofarads
$C_{68}$ = 200 to 400 micromicrofarads It will be obvious that the bridge will be balanced when $$\frac{C62}{C64} = \frac{C66}{C68}$$

and substituting the exemplary values:

$$\frac{10}{10} = \frac{200}{200}$$

In order for the rebalance capacitor 64 to move through its full range, it will be necessary for the capacitance of the probe 68 to increase to 400 micromicrofarads. With these conditions, the bridge will still be balanced:

$$\frac{C62}{C64} = \frac{C66}{C68}$$

or $$\frac{10}{20} = \frac{200}{400}$$

The bridge will then indicate full scale deflection for a change in the level of material 80 between its hightest and lowest points and the span of the bridge will be 1 to 2.

To adjust the span of the bridge circuit 28 without affecting its zero position, a pair of identical capacitors 88, 90 of substantially equal capacity are connected in parallel with the capacitors 62, 64 respectively by a lead wire 92 connected across the lead wires 24, 26 and the input terminals 70, 72 of the bridge circuit 28. A variable capacitor 94 is connected between the common terminal of the capacitors 88, 90 and the output terminal 74.

The capacitors 88 and 90 and 94 form a Y network and if the values of the capacitors 88 and 90 are equal and considerably larger than capacitor 94, it can be shown in a manner well known in the art, that this Y network is identical to a Δ network, consisting of three capacitors, two of them being equal, each having a value of about half of capacitor 94 and lying in shunt with capacitors 62 and 64 respectively and the third, being between point 24 and 26 and having approximately half the value of 88 or 90.

Assuming, for illustrative purposes, that the value of the capacitance added to each of the capacitors 62, 64 by the above described Δ network is 90 micromicrofarads and assuming that the probe capacity is at the minimum of 200 micromicrofarads then the bridge will be balanced when $$\frac{90 + C62}{90 + C64} = \frac{C66}{C68}$$

and substituting values $$\frac{90 + 10}{90 + 10} = \frac{200}{200}$$

or $$\frac{100}{100} = \frac{200}{200}$$

From this analysis it will be apparent that the probe capacitance only has to vary 20 micromicrofarads in order to obtain full scale variance of the rebalance capacitor 64 for a balanced bridge condition, that is $$\frac{C88 + C62}{C90 + (C64 + 10)} = \frac{C66}{C68}$$

or $$\frac{100}{110} = \frac{200}{220}$$

The span of the bridge, hence, is now only 1 to 1.1 instead of 1 to 2 as previously described.

The variable capacitor 94 provides means for adjusting the span of the bridge 28 without affecting the zero setting of the bridge. Adjustment of the capacitor 94 will add capacitance to both of the capacitors 88, 90 thereby decreasing the range of values which the probe 68 must experience before full scale variance and rebalance of capacitor 64 is effected.

Assuming for illustrative purposes that the variable capacitor 94 has values between 0 to 180 micromicrofarads, changes in its setting will place two equivalent capacitors in shunt with capacitors 62 and 64 respectively, varying in values between 0 and 90 micromicrofarads. We will then get at the extreme values of capacitor 94 the two aforementioned span setting values, 1 to 1.1 or 1 to 2. By suitable setting of capacitor 94 any span setting between 10% and 100% of zero value can thus be achieved, without affecting the bridge balance at the zero-point.

At minimum probe capacity with the bridge 28 in balance, there will be no output on the bridge. Any adjustment of the capacitance of the capacitor 94 will have no effect on the bridge balance because in any position thereof it is, in effect, adding the same capacity in parallel with the capacitors 62, 64. In this manner, the span of the bridge circuit may be varied resulting in minute variations of the probe capacity for full range deflection of the rebalance capacitor 64 without affecting the zero point of the bridge.

*Operation*

Assuming that the level of the material 80 is at the desired zero or reference level, the capacitor 66 may be adjusted so that the bridge 28 is balanced wherein only the unmodulated R.F. voltage will appear at the demodulator 32 and the output will be a D.C. voltage. Since the amplifier 34 will not respond to a D.C. voltage, there will be no signal delivered to the motor 46.

In the event the level of the material 80 rises, the capacity between the plates 84, 86 will increase resulting in a bridge unbalance the amount of which is proportional to the level of the material 80. With the bridge unbalanced, a modulated R.F. signal will appear at the output terminals 74, 76 which will be either in phase or out of phase with the reference voltage delivered by the conductor 36 from the oscillator 10. These two signals will intermix and after demodulation by means of the rectifier 32 and the network 38 and 39, the resulting 60 cycle signal will be amplified by the amplifier 34 and fed to the motor 46 which in response to the amplifier 60 cycle signal will rotate in a clockwise or counterclockwise direction depending upon the phase relationship of the mixed signals. The rebalance capacitor 64 will be turned in the direction necessary to rebalance the bridge and the torque delivered by the linkage 52 may be utilized to indicate the level of the material 80 or to control the level of the same.

Should it be desired to decrease the span of the bridge, the capacitor 94 may be adjusted to an increased capacitance to thereby decrease the range of values which the probe 68 must undergo before full scale variance of the rebalance capacitor 64 is effected. Also by means of the adjustable capacitor 58, the bridge may be adjusted to balance at a lower level of the material 80 and thereby control the level of the material 80 at a different value.

It should now be apparent that the invention is capable of indicating and/or controlling a condition by the measurement of an impedance and provides span and zero adjustment means for adjusting a bridge to any desired range of operation.

While only one embodiment of the invention has been herein shown and described, it will be apparent to those skilled in the art that many modifications of the disclosed embodiment of the invention may be made without departing from the scope of the invention as defined by the appended claims.

We claim:

1. A control device comprising a bridge circuit, means including a source of voltage for energizing said bridge circuit, means responsive to a condition to be controlled for unbalancing said bridge circuit in response to a predetermined change in said condition, means energized by unbalance of said bridge circuit for effecting a change in said condition, and means connected to said source of voltage and associated with said bridge circuit for varying the range of unbalance of said bridge circuit in response to a change in said condition.

2. A control device comprising an impedance bridge having a plurality of impedance arms, means for varying the impedance of one of said arms for effecting unbalance of said bridge, means for varying the impedance of another of said arms in response to unbalance of said bridge, and a Y network connected to said bridge for changing the ratio of variance of said impedance arms during unbalance of said bridge.

3. A control device comprising an impedance bridge having a plurality of impedance arms, means for varying the impedance of one of said arms for effecting unbalance of said bridge, means for varying the impedance of another of said arms in response to unbalance of said bridge, and impedance means operatively connected to said bridge for changing the range of unbalance of said bridge relative to the range of variance of said one impedance arm.

4. In a control device, the combination comprising an impedance bridge including a plurality of impedance arms and having a predetermined range of unbalance, means for varying the impedance of one of said arms for effecting unbalance of said bridge, and means including a variable impedance operatively connected to said bridge for changing the variance of said impedance in said one arm necessary to effect full range unbalance of said bridge.

5. In a control device, the combination comprising a bridge having four impedance arms and normally balanced when the ratio of the impedances of a first pair of said arms equals the ratio of the impedances of the other pair of said arms, a source of voltage connected across the input terminals of said bridge, means energized by unbalance of said bridge connected across the output terminals of said bridge, means for changing the impedance of one of said first pair of arms to effect unbalance of said bridge by changing said first ratio, means including the first said means for changing the impedance of one arm of the other of said pair of arms for rebalancing said bridge by changing the impedance ratio of said other pair of arms, and means including an impedance circuit connected to said source of voltage for varying the impedances of said other pair of arms to vary the impedance change of said unbalancing arm relative to said rebalancing arm when said bridge is unbalanced by said unbalancing means.

6. A bridge circuit comprising four capacitance elements arranged in connecting arms, a source of alternating potential connected across one pair of opposite bridge terminals, means energized by unbalance of the bridge connected across the other pair of opposite bridge terminals, a pair of capacitors serially connected across said input terminals, and an adjustable capacitor connected to one of said output terminals and the common junction of said serially connected capacitors for adding the capacitances of said serially connected capacitors and said adjustable capacitor to one pair of said connecting arms respectively.

7. In a control device, the combination comprising a first source of alternating voltage at a carrier frequency, a second source of alternating voltage at a carrier frequency modulated with an alternating voltage at a relatively low frequency, an impedance bridge of variable range energized by said second source of voltage, means varying the balance of said bridge in response to a condition to be controlled for varying the phase of said second source of voltage relative to said first source of voltage, and bridge rebalance means including a connection between said first source of voltage and the output of said bridge for deriving a resultant voltage of said relatively low frequency having a phase dependent on the relative phase of said first source of voltage and the output of said bridge.

8. In a control device, the combination comprising a first and a second source of alternating voltage at a carrier frequency, means for modulating said first source of voltage with an alternating voltage of a relatively low frequency, means including a normally balanced bridge circuit for varying the phase relationship of said first source of voltage with respect to said second source of voltage in response to a condition to be controlled, means for deriving a resultant voltage of said relatively low frequency jointly from said second source of voltage and the output of said bridge circuit, means energized by said relatively low frequency resultant voltage in accordance with the phase thereof for rebalancing said bridge circuit, and means for varying the range of unbalance of said bridge circuit during unbalancing of said bridge circuit.

9. In a control device, the combination comprising a source of unmodulated alternating voltage at a carrier frequency, a source of alternating voltage at a carrier frequency modulated with a relatively low frequency, an impedance bridge connected to the source of modulated alternating voltage, means for unbalancing said bridge circuit in response to a condition to be controlled, and means connected to rebalance said bridge circuit in response to a voltage of said relatively low frequency derived from the source of unmodulated alternating voltage and the output of said bridge circuit.

10. In a control device, the combination comprising a source of unmodulated alternating voltage at a carrier frequency, a source of alternating voltage at a carrier frequency modulated with an alternating voltage of a relatively low frequency, a bridge circuit connected to receive said modulated alternating voltage and including means in a branch thereof to unbalance said bridge circuit in response to a condition to be controlled, means connected to receive said unmodulated alternating voltage and the output of said bridge circuit for deriving therefrom a resultant voltage of said relatively low frequency, and load means operatively connected to said deriving means and energized by the resultant voltage of said relatively low frequency for rebalancing said bridge circuit.

11. In a control device, the combination comprising a first and second sources of alternating voltage at a carrier frequency, a source of alternating voltage at a relatively low frequency, means for modulating said first source of alternating voltage with said source of alternating voltage at a relatively low frequency, a bridge circuit connected to receive the output of said modulating means and including means in a branch thereof to unbalance said bridge circuit in response to a condition to be controlled, means for mixing said second source of alternating voltage with the output of said bridge circuit, a demodulator connected to receive the output of said mixing means to derive a resultant voltage of said relatively low frequency, and load means connected to said bridge circuit for rebalancing same in response to the output voltage from said demodulator.

12. In a control device, the combination comprising a first source of unmodulated alternating voltage at a carrier frequency, a second source of alternating voltage including a component of said first source of alternating voltage modulated by a source of alternating voltage at a relatively low frequency, a bridge circuit for varying the phase of said second source of voltage relative to the phase of said first source of alternating voltage in response to a condition to be controlled, means connected to receive said first source of voltage and the output from said bridge circuit for producing a resultant voltage of said relatively low frequency, and means energized by the resultant voltage of said relatively low frequency for rebalancing said bridge circuit.

13. In a control device, the combination comprising a first and second source of alternating voltage at a carrier frequency, a source of alternating voltage at a relatively low frequency, means for modulating said first source of alternating voltage with said source of alternating voltage at a relatively low frequency, a capacitance bridge circuit connected to receive the output of said modulating means and including a variable capacitor in a branch thereof to unbalance said bridge circuit is response to a condition to be controlled, means for mixing said second source of alternating voltage and the output of said bridge circuit, a demodulator connected to receive the output of said mixing means to derive a resultant voltage of said relatively low frequency, and motor means connected to another variable capacitor in said bridge circuit for rebalancing said bridge circuit in response to the output voltage from said demodulator.

References Cited in the file of this patent

UNITED STATES PATENTS

| | | |
|---|---|---|
| 1,975,226 | Zoeten | Oct. 2, 1934 |
| 2,269,374 | Kuhnemann | Jan. 6, 1942 |
| 2,338,732 | Nosker | Jan. 11, 1944 |
| 2,365,706 | Keinoth | Dec. 26, 1944 |
| 2,436,807 | Isbister | Mar. 2, 1948 |
| 2,457,165 | McNamee | Dec. 28, 1948 |
| 2,476,496 | Kleiver | July 19, 1949 |
| 2,476,849 | Ergen | July 19, 1949 |
| 2,501,583 | Shafer | Mar. 21, 1950 |
| 2,530,619 | Kleiver | Nov. 21, 1950 |
| 2,632,872 | Warsher | Mar. 24, 1953 |
| 2,657,352 | Sink | Oct. 27, 1953 |
| 2,750,556 | La Hue | June 12, 1956 |

OTHER REFERENCES

Hill, W.R.: Electronics in Engineering, McGraw-Hill, New York, 1949, Figs. 15.8 and 15.9, pages 246, 247.